United States Patent

[11] 3,626,103

[72] Inventors Ramses R. Mina;
Gunter F. Neumeier, both of Rochester, N.Y.
[21] Appl. No. 3,496
[22] Filed Jan. 16, 1970
[45] Patented Dec. 7, 1971
[73] Assignee Stromberg Carlson Corporation
Rochester, N.Y.

[54] ROUTE SELECTOR ARRANGEMENT WITH ALL-TRUNK AVAILABILITY

1 Claim, 3 Drawing Figs.

[52] U.S. Cl. .................... 179/18 AG
[51] Int. Cl. .................... H04q 3/06
[50] Field of Search .................... 179/18 AG

[56] References Cited
UNITED STATES PATENTS
1,271,855 7/1918 Clausen .................... 179/18 AG
1,161,602 11/1915 Bradbury .................... 179/18 FE

*Primary Examiner*—Kathleen H. Claffy
*Assistant Examiner*—Thomas W. Brown
*Attorneys*—Hoffman Stone and Charles C. Krawczyk

ABSTRACT: A step-by-step telephone switching system in which the trunks are permanently connected to the outputs of the first selectors. The selectors are arranged in groups with a small number of auxiliary selectors included in each group. The outputs of the auxiliary selectors are connected to the same trunks as are the outputs of the regular first selectors in the respective groups to which they are assigned. Auxiliary outputs on each of the regular first selectors are connected to the inputs of auxiliary selectors in each of the other groups. Each of the inputs has access to all of the trunks of the exchange, and no more than two selectors, one regular and one auxiliary, are used on any call.

PATENTED DEC 7 1971 3,626,103

SHEET 1 OF 3

INVENTORS.
RAMSES R. MINA
GUNTER NEUMEIER
BY
Hoffman Stone
ATTORNEY

ROUTE SELECTOR ARRANGEMENT WITH ALL-TRUNK AVAILABILITY

BRIEF DESCRIPTION

This application is a continuation of our copending application, Ser. No. 602,296, filed Dec. 16, 1966, and now abandoned.

This invention relates to a novel switching arrangement, and, more particularly, to a novel switching arrangement especially adapted for use in an automatic telephone exchange of the electromechanical type, which permits a reduction in the amount of equipment required to provide a given traffic capacity.

The system of the invention relates to the problem of effecting connections between central offices over trunklines. Generally, in a telephone system, limited numbers of trunklines are provided between the various different central offices, and when a call is placed through a given central office for a number served by a different central office, the equipment at the initiating office must determine which trunk the call should be routed over and perform the needed switching operations to connect the calling subscriber's line to the proper trunk. In previous systems, calls are generally switched to the trunks through stepping switches called selectors, with the signal inputs being connected to the movable contacts and the trunks to fixed contacts of the switches. The selectors have usually been arranged either in series as in step-by-step systems, or by connecting them in groups of two or more in link networks as in crossbar systems. In both of these types of arrangements, the number of selectors required is usually more than double the number of input circuits served by them and it is not usually possible to provide full access to all of the trunks for each of the input circuits.

The practice of the invention applies the principles of alternate routing to the problem of trunk selection, and makes possible the use of only a single stage switch for each input with a relatively small number of auxiliary switches. It also provides full access to all of the trunks for each input regardless of the numbers of trunks and inputs.

Briefly, in accordance with the invention, the input circuits of the system and the trunks of each route leaving the exchange are divided into an arbitrarily selected number of sections, typically five or six, but, for example, herein three. The input circuits of each group are separately connected to the movable contacts of individually assigned respective selector switches. The trunks are connected correspondingly to the fixed contacts of the selectors, each trunk being connected to corresponding fixed contacts of all of the selectors of its section. A relatively small number of auxiliary selectors are provided in each section depending upon traffic requirements, and the trunks are connected to their fixed contacts also.

The selectors have more fixed contacts, or index positions than required for the trunks connected to them. The extra fixed contacts are called overflow contacts, and they are separately connected to the movable contacts of respective auxiliary selectors in all of the other sections of the system. Thus, when one of the input selectors during a peak load period, for example, finds that all of its trunks on a desired route are busy, it moves to one or another of its overflow contacts, which provide access to all of the other trunks on the route through the auxiliary selectors.

The practice of the invention enables a many-fold increase in the effective trunk capacity of the individual selectors without necessitating an increase in the number of their fixed contact positions. It therefore permits a reduction in the number of trunks needed to handle a given traffic load, and also a significant reduction in central office equipment.

DETAILED DESCRIPTION

Figure 1:
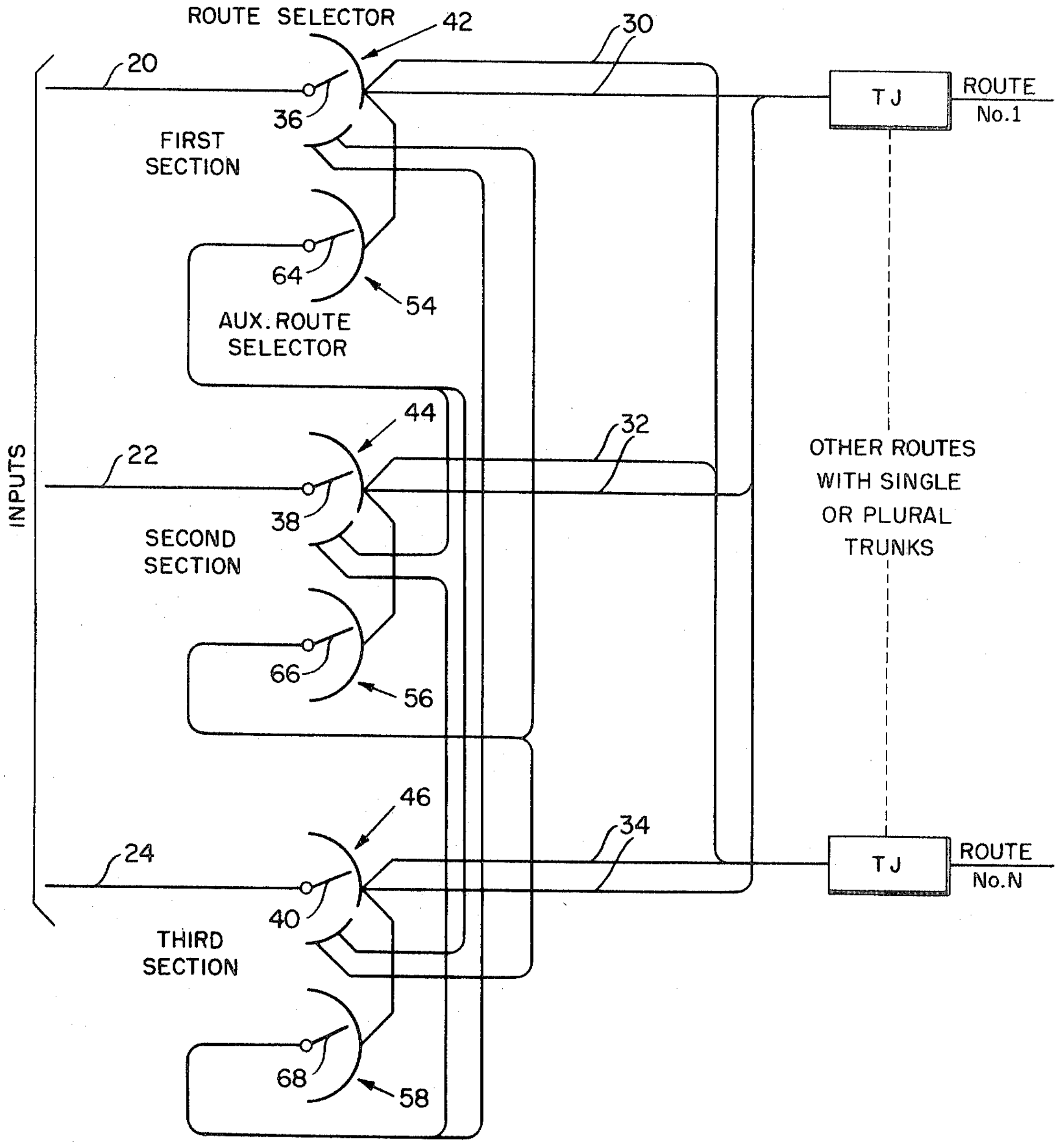
Figure 2:
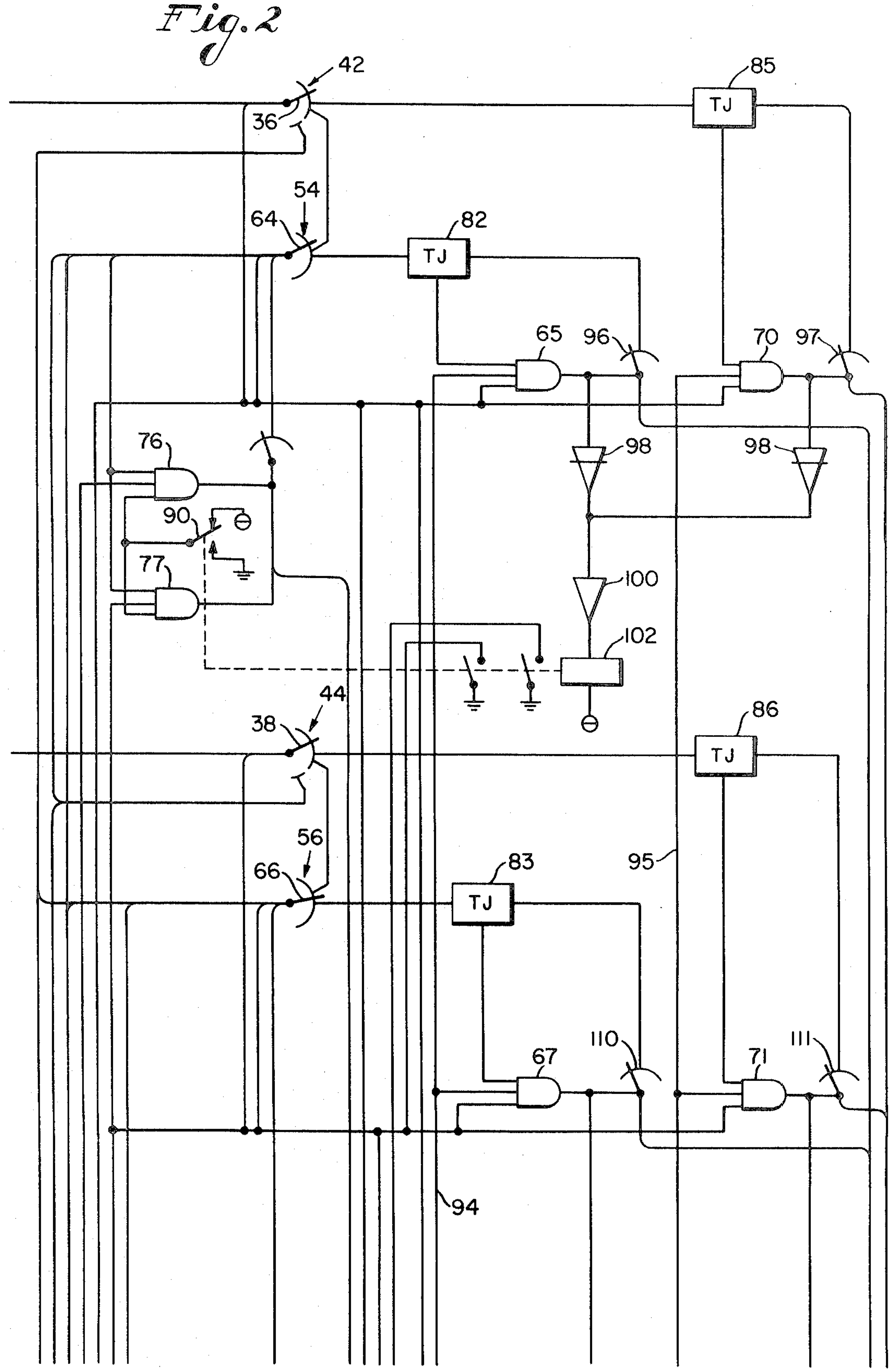
Figure 3:
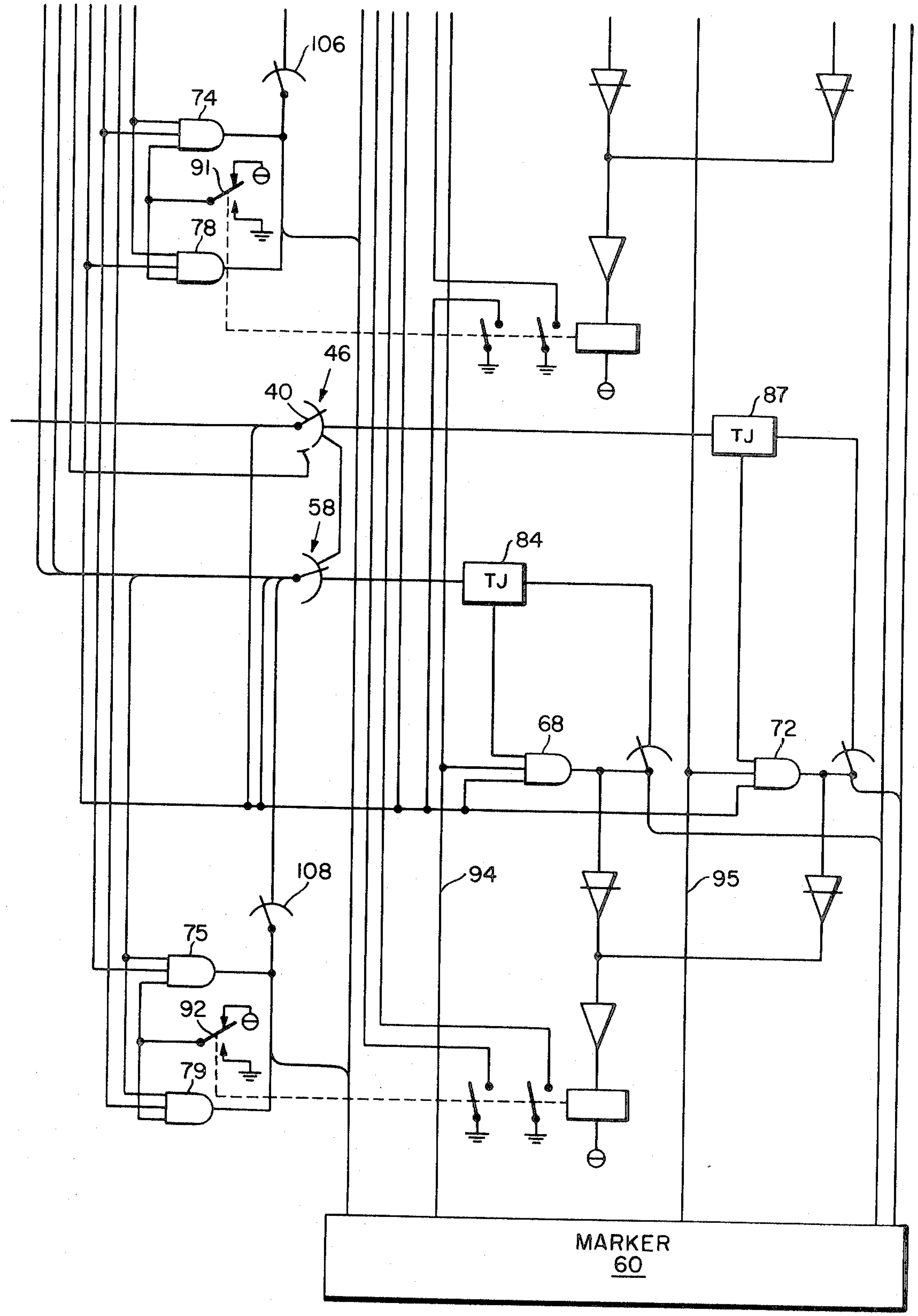

An illustrative embodiment of the invention will now be described in detail in connection with the accompanying drawings, wherein:

FIG. 1 is a schematic diagram illustrating the principles of the invention; and, FIGS. 2 and 3 taken together edge to edge, with FIG. 2 above FIG. 3, constitute a schematic circuit diagram of a switching circuit according to an illustrative embodiment of the invention including a control arrangement for the input and auxiliary selectors.

Symbols conventionally used in the telephone industry have been used throughout the drawings. Circuit connections are indicated by single lines, although it will be understood that in practice, the trunks, for example, will be two-wire or four-wire lines. Also, matrices and circuit components that are arranged in multiple arrays are indicated only by representative units thereof, and certain minor, obvious components such as diodes have been omitted to avoid unduly complicating the drawing and obscuring the invention.

FIG. 1 illustrates, in simplified diagrammatical form, a trunk selector arrangement according to the invention having 156 inputs 20, 22, and 24, and a total of 600 trunks 30, 32, and 34, divided into three sections. The inputs 20, 22, and 24 are respectively connected to the movable contacts 36, 38, and 40 of 156 multiposition switches 42, 44, and 46, called the input selectors, each of which has 224 separate fixed contact positions (not designated). One third 30 of the trunks are connected to corresponding fixed contacts of all the selectors 42 of the first section. A second third 32 of the trunks are similarly connected to corresponding fixed contacts of all of the selectors 44 of the second section. The last third 34 of the trunks are connected in like fashion to the input selectors 46 of the third section. Preferably, the arrangement of trunks is selected so that one third of the trunks on each route are connected to the selectors of each section.

Twelve auxiliary stepping switches 54, 56, and 58, called the auxiliary selectors, are associated with the respective input selectors 42, 44, and 46 of each section. The auxiliary selectors 54, 56, and 58 need have only 200 fixed contact positions, but for convenience, they may be of identical construction to the input selectors 42, 44, and 46. The trunks 30, 32, and 34 are connected also to the fixed contacts of the auxiliary selectors 54, 56, and 58 in their respective assigned sections.

The trunks 30, 32, and 34 take up only 200 of the 224 fixed contact positions on the input selectors 42, 44, and 46. The extra 24 fixed contact positions of the input selectors of each section are connected to the movable contacts 64, 66, and 68 of the auxiliary selectors in the other sections.

In operation, the system is controlled so that when a particular one of the input selectors 42, 44, and 46 is seized by an incoming call, that selector will route the call to one of the trunks connected to it if one is available on the desired route. If all of the trunks on the desired route connected to the seized input selector are busy, the system then scans the trunks of the same route connected in the other sections, and when an available trunk is found, the seized input selector directs the call to it through one of the auxiliary selectors in the section to which the available trunk is connected. Each of the 156 input selectors 42, 44, and 46 is thus given access to all of the 600 trunks of the system, using only a minimum number of switches.

FIGS. 2 and 3 show an illustrative circuit for directing and controlling the operation of the selectors 42, 44, and 46 and the auxiliary selectors 54, 56, and 58 as just described. The circuit as shown is arranged to operate responsively to a marker 60 of the type described and claimed in the copending application of A. A. Jorgensen, Ser. No. 377,949 filed June 24, 1964, now U.S. Pat. No. 3,364,312, dated Jan. 16, 1968, entitled, "Time Division Principle," and assigned to the present assignee, but other types of marking systems may also be adapted for use with it.

The movable contacts 36, 38 and 40 of the input selectors, which are marked through normally closed off-normal contacts when the selectors are seized, are connected to inputs of control AND-gates 65, 67, and 68, and 70, 71, and 72 in their respective sections, and to the inputs of auxiliary AND-gates 74, 75, 76, 77, 78, and 79, one set in each of the other sections. The trunks 30, 32, and 34 are connected to the selectors through terminal junctors 82, 83, 84, 85, 86, and 87. One junctor is provided in each section for each trunk route. Each junctor 82–87 produces an output mark for marking one of the inputs of one of the control gates 66–68, and 70–72 whenever one of the trunks connected to it is available. If all of the trunks connected to a particular junctor are busy, it produces no marks, but instead inhibits the control gate to which it is connected.

The off-normal contacts of the auxiliary selectors 54, 56, and 58 in each section are arranged to mark input terminals of the auxiliary gates 74–79 in the same sections as the respective auxiliary selectors. The third input terminal of each of the auxiliary gates 74–79 is normally marked through a relay contact 90, 91 or 92, the action of which will be explained hereinafter.

The third input terminals of the control AND-gates 66–68 and 70–72 are connected to route identifying leads 94 and 95 in accordance with the routes served by the junctors 82–87 that are connected to the respective control gates. The control gates 66–68 and 70–72 are arranged as a coordinate matrix having a column for each trunk route and a row for each input selector 42, 44, and 46.

Further details of the circuit can perhaps be best understood through the following description of its operation in response to a call, which will be assumed to be received at the input of one of the input selectors 42 in the first section.

When the input selector 42 is seized in response to the assumed call, a mark is applied through one of its off-normal contacts (not shown) to one of the inputs of the control gate 66 or 70 that serves the desired route. Simultaneously with seizure of the input selector 42, the marker 60 marks the appropriate route identifying lead 94 and 95. If there is a trunk available on the desired route, the appropriate control gate 65 or 70 then becomes fully enabled and produces an output signal to start a finder 96 or 97, which scans the trunks of the corresponding junctor 82 or 85.

The output of the control gate 65 or 70 is also applied through an invertor 98 and an amplifier 100 to actuate a preference relay 102, which, when actuated, inhibits all of the control gates 67, 68, 71, and 72 in the second and third sections of the circuit. The preference relay 102 also inhibits the auxiliary control gates 76 and 77 in its own section through movement of its contact 90 from the normally enabling negative voltage source to ground.

When the finder 96 or 97 finds an available trunk, it stops hunting and effects a connection between the junctor 82 or 85 and the input selector 42 to mark the appropriate fixed contact position of the selector 42. The marker 60 senses the finding of the available trunk by the finder 96 or 97 and produces a signal instructing the selector 42 to hunt for the marked index position. The mark from the selector 42 is applied to the control gate 65 or 70, and to the auxiliary gates 74 and 75 through off-normal contacts of the selector 42. When, therefore, the selector 42 starts to hunt for the marked line, the mark is removed and the gates again become inhibited. The main finder 96 or 97 is held in position for the duration of the call by a mark from the marker 60, but the auxiliary finders 106 and 108, which are connected to the outputs of the auxiliary gates 74 and 75, immediately stop hunting and return to their normal positions. The preference relay 102 also drops out, and the circuit is once again in its normal, ready-to-serve condition.

The foregoing description was based on the assumption that a trunk was available on the desired route in the same section as the seized input selector 42. If no such trunk is available, the control AND-gate 65 or 70 will not produce an output signal. Instead, the auxiliary finders 106 and 108 in the second and third sections, respectively, which started responsively to the outputs of the auxiliary gates 74 and 75, respectively, will continue to hunt until one of them finds an available auxiliary selector 56 or 58, which has a trunk available on the desired route, whereupon the call is assigned to that trunk. For example, assume that the first found available trunk is in the second section. As soon as the finder 106 finds an available auxiliary selector 56 it applies a mark through the auxiliary selector 56 to the third inputs of the control gates 67 and 71 in the second section, and also to the overflow contact of the seized input selector 42. The output of the one of the gates 67 and 71 marked by the route identifying mark then causes its finder 110 or 111 to seek the available trunk in its junctor 83 or 86, respectively. The finder 110 or 111 finds the marked trunk and connects it to the seized auxiliary selector 56.

The marker 60 then produces signals to cause both the input selector 42 and the auxiliary selector 56 to hunt simultaneously for their marked positions. Both of the selectors 42 and 56 start at their normal positions, and they are both arranged to step by their trunk positions before stepping to their overflow, or extra contact positions. The auxiliary selector 56, therefore, normally finds its marked position before the input selector 42 reaches its overflow positions, and the call is put through in minimum time.

When a trunk on the desired route is not available in the same section as the seized input selector, a race ensues among the finders 96, 97, 110, and 111 in all the other sections to locate an available trunk on the desired route. The call is assigned to the first found available trunk, and all the other sections are disabled in similar manner as though the call had been placed through a trunk in the same section as the seized selector. In the rare event that two of the finders find alternate trunks simultaneously, all of the sections are disabled and busy tone is supplied to the calling line, as is also the case when no trunk is found on the desired route.

To insure proper lockout during normal traffic operation, the auxiliary finders 106 and 108 are delayed to permit completion of the connection through a trunk in the same section as the initially seized input selector before the auxiliary finder 106 or 108 assigns an auxiliary selector 56 or 58 to the call.

Thus, the application of the principles of alternate routing permits the use of only a relatively small number of auxiliary selectors, together with only a single selector for each input circuit to provide access to all of the trunks for all of the input circuits.

What is claimed is:

1. A switching arrangement for a telephone exchange or the like selectively to connect plural input circuits individually to any desired one of plural trunks comprising:

a. input selector switches equal in number to the input circuits, b. means connecting the input circuits to the inputs of said input selector switches, c. auxiliary selector switches smaller in number than said input selector switches, d. the trunks being permanently connected to the outputs of said input selector switches and of said auxiliary selector switches by sections with respective groups of the trunks being connected to corresponding groups of said input and auxiliary selector switches, there being more than two groups of trunks and selector switches, e. said input selector switches having outputs in excess of the number of trunks assigned to them, the outputs of said auxiliary selector switches being limited to the number of trunks connected to them, f. means connecting said excess outputs of said input selector switches in each group to the inputs of separate respective ones of said auxiliary selector switches in all other groups, and g. control means responsive to the appearance of a call at the input of one of said input selector switches for causing said one input selector switch to connect its input to a trunk assigned to it if a trunk so assigned is available, and, alternatively, if a trunk so assigned is not available, to connect its input through one of said auxiliary selector switches to a trunk assigned to a group of selector switches different from the group to which said one input selector switch belongs.

* * * * *

75